United States Patent
Tucker (10) Patent No.: US 12,256,059 B2
(45) Date of Patent: Mar. 18, 2025

(54) STIMULUS-RESPONSIVE DEPTH-CHANGING DISPLAY

(71) Applicant: T-Mobile USA, Inc., Bellevue, WA (US)

(72) Inventor: Wilfred I. Tucker, Centennial, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/314,605

(22) Filed: May 9, 2023

(65) Prior Publication Data

US 2024/0380877 A1    Nov. 14, 2024

(51) Int. Cl.

| | | |
|---|---|---|
| H04N 13/393 | (2018.01) | |
| G06T 7/50 | (2017.01) | |
| G09G 3/32 | (2016.01) | |
| G06T 15/04 | (2011.01) | |
| G06T 15/08 | (2011.01) | |
| G09G 3/3208 | (2016.01) | |
| G09G 3/3225 | (2016.01) | |

(52) U.S. Cl.
CPC ............ H04N 13/393 (2018.05); G06T 7/50 (2017.01); G09G 3/32 (2013.01); *G06T 15/04* (2013.01); *G06T 15/08* (2013.01); *G09G 3/3208* (2013.01); *G09G 3/3225* (2013.01)

(58) Field of Classification Search
CPC ......... H04N 13/393; G06T 7/50; G06T 15/04; G06T 15/08; G09G 3/32; G09G 3/3208; G09G 3/3225

USPC .......................................................... 345/204
See application file for complete search history.

(56) References Cited

U.S. PATENT DOCUMENTS

| | | | | |
|---|---|---|---|---|
| 6,064,423 | A | * | 5/2000 | Geng .................. G02B 30/54 |
| | | | | 348/E13.058 |
| 9,093,643 | B2 | * | 7/2015 | Tanaka ................. H10N 30/857 |
| 9,716,878 | B2 | * | 7/2017 | Teller .................... H04N 13/398 |
| 9,720,084 | B2 | | 8/2017 | Horner et al. |
| 9,858,649 | B2 | | 1/2018 | Liang et al. |
| 10,474,145 | B2 | | 11/2019 | Guo et al. |

(Continued)

FOREIGN PATENT DOCUMENTS

| | | |
|---|---|---|
| CN | 111033569 A | 4/2020 |
| CN | 111542831 A | 8/2020 |

(Continued)

*Primary Examiner* — Tom V Sheng
(74) *Attorney, Agent, or Firm* — Perkins Coie LLP (57) ABSTRACT

This document describes techniques, apparatuses, and systems for a stimulus-responsive depth-changing display. An electronic device includes a flexible display and a stimulus-responsive material disposed at least partially under the display. The electronic device receives image data and determines depth data associated with the image data. An image is displayed on the flexible display based on the image data. While displaying the image on the flexible display, the stimulus-responsive material can be activated by a stimulus to cause the stimulus-responsive material to change from a first shape to a second shape. In changing from the first shape to the second shape, the stimulus-responsive material displaces at least a portion of the flexible display. In doing so, the shape of the flexible display can be reconfigured to add depth to a displayed image.

15 Claims, 6 Drawing Sheets

(56) References Cited

U.S. PATENT DOCUMENTS

| | | |
|---|---|---|
| 10,552,947 B2 | 2/2020 | Liang et al. |
| 10,750,210 B2 | 8/2020 | Goldman et al. |
| 10,861,239 B2 | 12/2020 | Jones et al. |
| 10,937,385 B1 | 3/2021 | Holland et al. |
| 11,036,049 B2 | 6/2021 | Baerenrodt et al. |
| 11,061,473 B2 | 7/2021 | Ryan et al. |
| 11,094,041 B2 | 8/2021 | Chen |
| 11,199,615 B2 | 12/2021 | Horner |
| 11,258,965 B2 | 2/2022 | Lee et al. |
| 11,301,775 B2 | 4/2022 | Li et al. |
| 11,303,812 B2 | 4/2022 | Malia et al. |
| 11,334,230 B2 | 5/2022 | Shin et al. |
| 11,520,151 B2 | 12/2022 | Baerenrodt et al. |
| 2010/0277574 A1* | 11/2010 | Furuta ............... H04N 13/398 348/51 |
| 2012/0133494 A1* | 5/2012 | Cruz-Hernandez ......... G06F 3/04886 340/407.1 |
| 2015/0262421 A1* | 9/2015 | Bell .................. G06T 17/20 345/423 |
| 2017/0213488 A1* | 7/2017 | Koo ................... G06F 1/1652 |
| 2017/0302914 A1* | 10/2017 | Tonar ................ H04N 13/398 |
| 2017/0368343 A1 | 12/2017 | Jones et al. |
| 2018/0077384 A1 | 3/2018 | Goldman et al. |
| 2018/0144555 A1* | 5/2018 | Ford ................... G06T 15/20 |
| 2019/0019966 A1* | 1/2019 | Jiang ................. H10K 59/124 |
| 2019/0282153 A1 | 9/2019 | Pradeep et al. |
| 2020/0375289 A1 | 12/2020 | Agarwal et al. |
| 2022/0077573 A1* | 3/2022 | Boul .................. C09K 19/32 |
| 2022/0260433 A1* | 8/2022 | Arrieta Diaz ......... G01L 1/044 |
| 2022/0262022 A1* | 8/2022 | Stauber .............. G06T 7/50 |
| 2022/0313206 A1 | 10/2022 | Da Cruz et al. |
| 2023/0039911 A1 | 2/2023 | Baerenrodt et al. |

FOREIGN PATENT DOCUMENTS

| | | |
|---|---|---|
| CN | 111752383 A | 10/2020 |
| CN | 112955974 A | 6/2021 |
| CN | 110914863 B | 7/2021 |
| CN | 113423322 A | 9/2021 |
| CN | 113474787 A | 10/2021 |
| CN | 114675420 A | 6/2022 |
| CN | 114698389 A | 7/2022 |
| CN | 111788623 B | 2/2023 |
| CN | 109982741 B | 4/2023 |
| EP | 3444805 A1 | 2/2019 |
| EP | 3500977 A1 | 6/2019 |
| EP | 3510768 A1 | 7/2019 |
| EP | 3170019 B1 | 6/2020 |
| EP | 3661189 A1 | 6/2020 |
| EP | 3735684 A2 | 11/2020 |
| EP | 3220829 B1 | 3/2022 |
| JP | 2020519775 A | 7/2020 |
| JP | 6873238 B2 | 4/2021 |
| JP | 7073238 B2 | 5/2022 |
| KR | 102142643 B1 | 8/2020 |
| KR | 102256707 B1 | 5/2021 |
| KR | 20210110164 A | 9/2021 |
| WO | 0064330 A1 | 11/2000 |
| WO | 2009094017 A1 | 7/2009 |
| WO | 2016009336 A1 | 1/2016 |
| WO | 2016081321 A2 | 5/2016 |
| WO | 2018049201 A1 | 3/2018 |
| WO | 2018089091 A1 | 5/2018 |
| WO | 2018204688 A1 | 11/2018 |
| WO | 2019035551 A1 | 2/2019 |
| WO | 2019135202 A2 | 7/2019 |
| WO | 2020055613 A1 | 3/2020 |
| WO | 2021240056 A1 | 12/2021 |

* cited by examiner

STIMULUS-RESPONSIVE DEPTH-CHANGING DISPLAY

BACKGROUND

Televisions and other display devices provide additional platforms through which a user can enjoy content. User experience can be improved by making the content appear more realistic, as if the user were physically experiencing the content rather than experiencing it digitally through the display. To this end, previous technologies have attempted to make displays more engaging by displaying an image that appears three-dimensional (3D). One example includes stereoscopy, which involves displaying multiple copies of an image laterally offset from one another such that the way in which a user's eyes combine the copies of the image makes the image appear to have 3D characteristics. However, images displayed using stereoscopy often appear awkward or artificial, which can degrade user experience.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Electronic devices include displays, which can be used to present content to a user. Displays have been widely adopted for many recreational uses, such as watching television and movies. More recently, displays have become a popular way to present artwork or photography. The use of displays to present digital art has only been fueled by the increase in popularity of non-fungible tokens (NFTs), which can be presented on digital displays. Current displays present images in two dimensions (2D), and as a result, fail to capture the grandeur of these images. Some displays attempt to mimic the 3D properties of images using stereoscopy, which involves presenting laterally offset copies of the image that, when viewed by a user, provide the illusion of a 3D image. These techniques generally require the user to wear special viewing glasses, and even then, these 3D images can appear artificial and limit the immersivity of the viewing experience. Accordingly, user experience can be improved by providing a more authentic technique for displaying an image with a depth dimension.

The present technology provides an electronic device with a stimulus-responsive depth-changing display that can be reconfigured to add a depth dimension to a displayed image. Take, for example, a situation in which a user displays an image (e.g., a frame of a video, a photograph, or an NFT) on a digital display. The digital display can receive image data indicative of the image. Depth data associated with the image data and indicating a perceived depth at different portions of the image can be determined by the present system or received with the image data. For example, the depth data can be determined using a 2D-to-3D image converter by analyzing the image data. In some cases, the image data can be analyzed (e.g., based on image data at a particular location of the image or one or more surrounding locations) to determine a perceived depth (e.g., the extent to which an element at that location is located in the background or the foreground of the image) at a particular location. In other cases, the depth data can be received from a radar, lidar, or other system that is capable of capturing a depth dimension, and thus the system receives both image data and depth data for the image data. For example, an imaging system can include sensors capable of capturing light/color from an environment (e.g., complementary metal-oxide semiconductor (CMOS) sensors) and sensors capable of capturing the depth of elements in an environment (e.g., radar or lidar sensors).

The electronic device can include a stimulus-responsive material that is configured to change shape in response to an activation by a stimulant. For example, the stimulus-responsive material can expand or contract in response to exposure to a stimulant (e.g., current, a magnetic field, heat, or a chemical). In aspects, the stimulus-responsive material can include magnetic, electroactive, or thermally activated nanoparticles or a magnetic, electroactive, or thermally activated polymer. The stimulus-responsive material can be activated using the stimulant and based on the depth data to cause the stimulus-responsive material to change shape. The stimulus-responsive material can be disposed at least partially under a flexible display of the electronic device such that the flexible display is displaced into a new configuration in response to the stimulus-responsive material changing shape. The stimulus-responsive material can be an array of transducers that are disposed at least partially under the flexible display, and one or more transducers move from a first position to a second position based on electromagnetic signals produced from the depth data. In this way, the flexible display can extrude or recede from a resting position while the image is displayed to present an image with a depth dimension.

The stimulus-responsive material can be configured in any number of arrangements to enable different configurations of the flexible display to be implemented. For example, the stimulus-responsive material can include a continuous layer of stimulus-responsive material that can be activated at various portions or multiple discrete portions (e.g., arranged in a grid) that can be individually activated to expand or contract respective portions of the stimulus-responsive material. The amount to which the stimulus-responsive material displaces can vary based on the amount of the stimulant to which the stimulus-responsive material is exposed. Thus, the flexible display can be arranged into different configurations by applying different amounts of stimulant to different portions. In other cases, each portion of the stimulus-responsive material can be binary such that it is configured in a deactivated position when it is not exposed to the stimulant and an activated position when it is exposed to the stimulant. In this case, various portions of the stimulus-responsive material can be at least partially layered over one another and individually activated to enable the flexible display to be arranged in different configurations. By implementing multiple portions of the stimulus-responsive material overlapping one another, the flexible display can be arranged through multiple degrees of freedom.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Electronic Device

Figure 1:
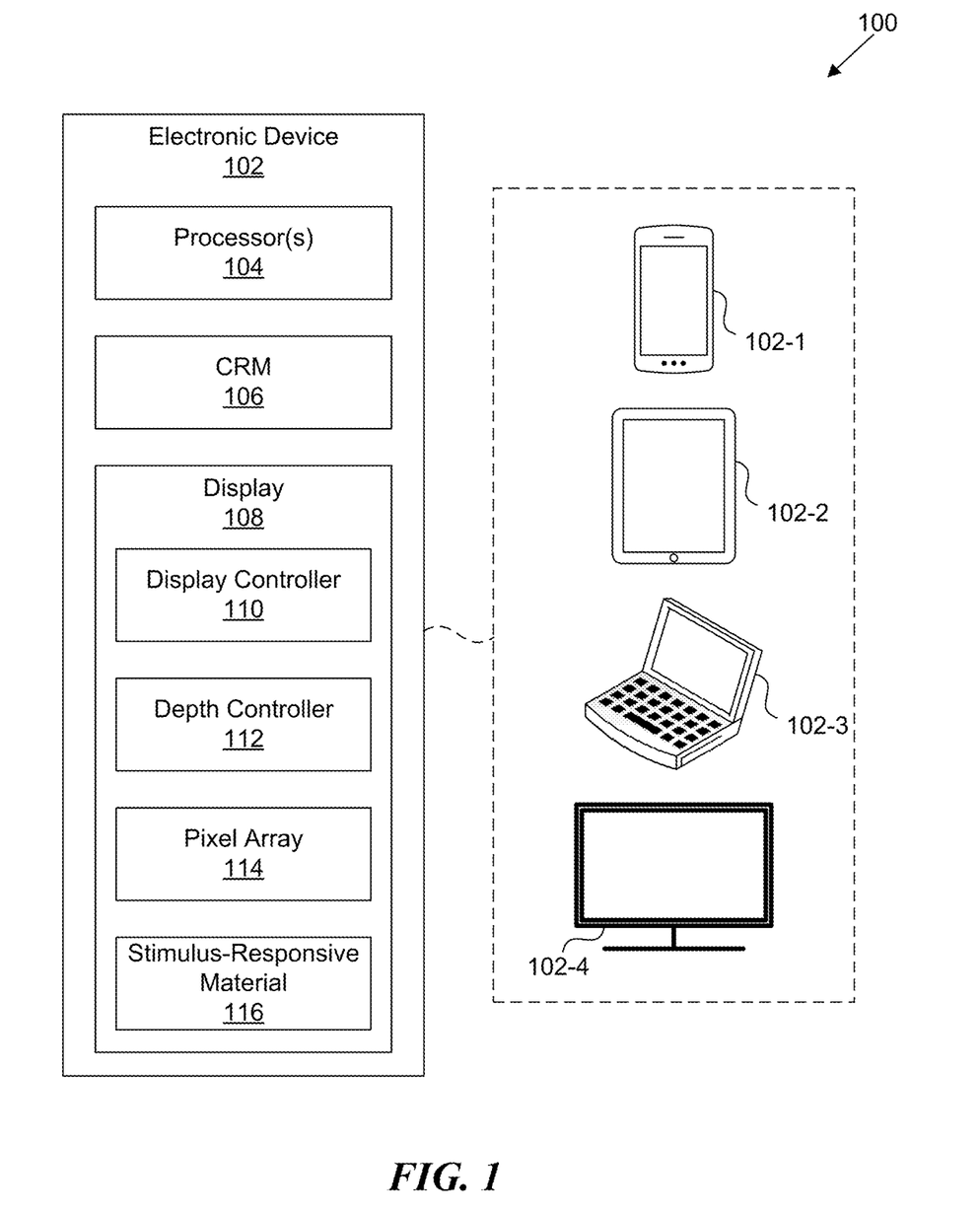
FIG. 1 illustrates an example operating environment in which aspects of the present technology can be implemented.

FIG. 1 illustrates an example operating environment 100 that includes an electronic device 102 in which aspects of the present technology can be implemented. The electronic device 102 can include additional components and interfaces omitted from FIG. 1 for the sake of clarity. The electronic device 102 can be a variety of electronic devices, including a phone 102-1, a tablet device 102-2, a laptop computer 102-3, a display device 102-4 (e.g., television or monitor), or the like.

The electronic device 102 includes one or more processors 104 and at least one computer-readable media (CRM 106) storing machine-executable instructions that, when executed by the one or more processors 104, perform one or more aspects of the present technology described herein. For example, the processors 104 can execute instructions on the CRM 106 to control the creation or presentation of images on a display 108. Alternatively, one or more operations relating to creation or presentation of images on the display 108 can be managed by a display controller 110, which can include one or more processors that are the same as or different from the processors 104. The one or more processors 104 can include, as non-limiting examples, a system on chip (SoC), an application processor (AP), a central processing unit (CPU), or a graphics processing unit (GPU). An SoC, an AP, or a CPU generally executes commands and processes needed for the electronic device 102 and an operating system installed thereon. A GPU performs operations to display graphics of the electronic device 102 on the display 108 and can perform other specific computational tasks. The one or more processors 104 can be single-core or multiple-core processors.

The electronic device 102 also includes the CRM 106. The CRM 106 is a suitable storage device (e.g., random-access memory (RAM), static RAM (SRAM), dynamic RAM (DRAM), non-volatile RAM (NVRAM), read-only memory (ROM), Flash memory) usable to store device data of the electronic device 102. The device data can include the operating system, one or more applications of the electronic device 102, user data, and multimedia data. The operating system generally manages hardware and software resources (e.g., the applications) of the electronic device 102 and provides common services for the applications. The operating system and the applications are generally executable by the processors 104 (e.g., an SoC, an AP, a CPU) to enable communications and user interaction with the electronic device 102.

The electronic device 102 includes the display 108, which can be of any particular type (e.g., a liquid crystal display (LCD), a light-emitting diode (LED) display, a quantum dot LED (QLED) display, an organic LED (OLED) display, an active-matrix OLED (AMOLED) display). In aspects, the display 108 is flexible such that the display can fold, expand, compress, or otherwise be reconfigured. The display 108 can include a flexible screen made of plastic, glass, or any other flexible, translucent material and display circuitry (e.g., diodes, transistors, wiring) that can reconfigure in shape. As illustrated, the display 108 can include the display controller 110, a depth controller 112, a pixel array 114, and a stimulus-responsive material 116.

The display controller 110 can provide interfacing functionality between the processors 104 and the pixel array 114. In aspects, the display controller 110 can be responsible for one or more aspects of the creation or presentation of images on the display. For example, the display controller 110 can receive command signaling (e.g., indicative of image data) from the processors 104 and transmit, to the pixel array 114, signals with appropriate voltage, current, timing, and demultiplexing to enable the pixel array 114 to present an image on the display 108.

The depth controller 112 similarly provides interfacing functionality between the processors 104 and the stimulus-responsive material 116. The stimulus-responsive material 116 can include a material that is activated in response to exposure to a stimulant. In general, the stimulus-responsive material 116 is configured to displace when exposed to the stimulant. The stimulus-responsive material 116 can be at least partially disposed proximate to and under the display 108 (e.g., a screen of the display 108). In this way, the flexible display 108 can be displaced when the stimulus-responsive material 116 is reconfigured in response to exposure to a stimulant. As non-limiting examples, the stimulant can include an exposure to current, a magnetic field, heat, or a chemical. In this way, the stimulus-responsive material 116 can include a magnetic, electroactive, thermally activated, or chemically activated material, such as a polymer or a collection of nanoparticles.

The depth controller 112 can function similarly to the display controller 110 but with respect to the stimulus-responsive material 116 instead of the pixel array 114. For instance, the depth controller 112 can determine depth data indicative of a perceived depth associated with different locations in the image (e.g., one or more pixels). In some cases, the depth data can be provided to the depth controller 112 (e.g., from a radar or lidar system that collects depth information from an environment that has been imaged), while in other cases, the depth controller 112 determines the depth data by analyzing the image data indicative of the image (e.g., performing 2D-to-3D conversion of the image data). Based on the depth data, the depth controller 112 can transmit signaling to the stimulus-responsive material 116 with appropriate voltage, current, timing, and demultiplexing to expose the stimulus-responsive material 116 to the stimulant. The signaling can be transmitted to specific portions of the stimulus-responsive material 116 to expose the specific portions to the stimulant. The stimulus-responsive material 116 can be exposed to the stimulant directly from the circuitry (e.g., the circuitry transmits current, which is exposed to the stimulus-responsive material 116, used to generate a magnetic field, or used to generate heat) or through an actuator (e.g., a magnetic actuator, heater, or chemical dispenser) coupled with the circuitry. In general, however, activating the stimulus-responsive material 116 can reconfigure the shape of the flexible display 108 to add a depth to the display 108. In doing so, an image can be presented on the display 108 with a depth dimension.

Example Depth—Changing Display

Figure 2:
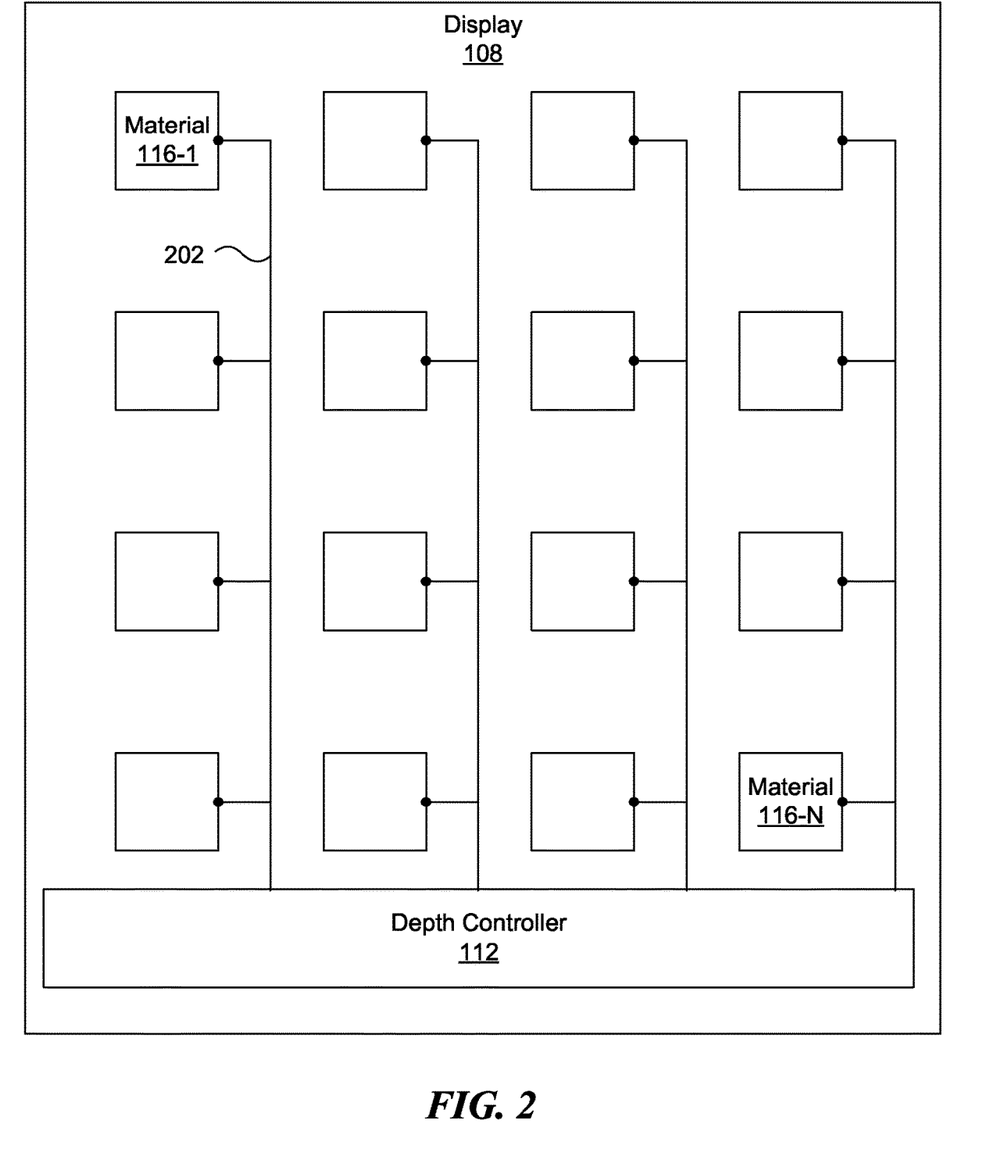
FIG. 2 illustrates an example device display that can implement aspects of the present technology.

FIG. 2 illustrates an example device display 108 that can implement aspects of the present technology. As illustrated, the display 108 includes multiple discrete portions of stimulus-responsive material 116-1 through 116-N (referred to collectively as the stimulus-responsive material 116) coupled with a depth controller 112 through circuitry 202. Each of the multiple discrete portions of stimulus-responsive material 116 can be activated individually or one or more portions of stimulus-responsive material 116 can be activated collectively through the circuitry 202. For example, the circuitry 202 can be shared across one or more rows or columns of the stimulus-responsive material 116. In this way, the stimulus-responsive material 116 can be activated in rows through common column circuitry similar to a pixel array (e.g., a single row can be activated, and signaling effective to expose a portion of the stimulus-responsive material to the stimulant can be sent across common column circuitry to reconfigure an activated portion). In this case, the various portions of the stimulus-responsive material 116 can be activated at different times. In other cases, each of the portions of the stimulus-responsive material 116 can be activated independently and can thus be activated concurrently.

As illustrated, the portions of the stimulus-responsive material 116 are arranged in a grid pattern; however, different arrangements of the stimulus-responsive material 116 are possible to enable different configurations of the display 108. In this way, the portions of the stimulus-responsive material 116 at different locations can be activated to arrange the screen in a specific configuration. For example, the depth data can indicate perceived depths at different locations of an image to be presented on the display 108. Thus, a portion of the stimulus-responsive material 116 at a location on the display 108 can be activated based on the depth data that corresponds to that location. In this way, different portions of the stimulus-responsive material 116 can be displaced by different amounts. In some cases, the stimulus-responsive material 116 can be displaced by different amounts based on the amount of the stimulant (e.g., current) applied at the location. As a result, the amount of the stimulant applied to each of the portions of the stimulus-responsive material 116 can be based on the depth data. In aspects, the stimulus-responsive material 116 can expand or contract (e.g., along an axis perpendicular to the display 108 (extending out of the page of FIG. 2 as illustrated) or along any other axis) based on exposure to the stimulant. Thus, activation of the stimulus-responsive material 116 can cause the display 108 to protrude or recess at different locations to add depth to a displayed image. In other cases, the stimulus-responsive material 116 can include particles (e.g., nanoparticles) that gather or disperse when activated by the stimulant. In this way, buildup of the particles can create protrusions on the display 108 and scattering of the particles can create recessions on the display 108.

Although illustrated as discrete portions, the stimulus-responsive material 116 can be a continuous portion of the stimulus-responsive material 116 coupled to the circuitry 202 at different locations. Thus, although the stimulus-responsive material 116 is a continuous portion, different locations of the stimulus-responsive material 116 can be activated individually.

In other cases, the stimulus-responsive material 116 can be configured in one of two positions: an activated position when the stimulus-responsive material 116 is exposed to the stimulant and a deactivated position when the stimulus-responsive material 116 is not exposed to the stimulant. In this way, different configurations of the display 108 may be achieved not by varying the amount of the stimulant applied to the stimulus-responsive material 116 but instead by layering portions of the stimulus-responsive material 116 at least partially over one another to provide multiple degrees of freedom to actuate the stimulus-responsive material 116. Thus, the different configurations can be achieved by activating different portions of the layered stimulus-responsive material 116. Different layering configurations of the stimulus-responsive material 116 can be selected based on the different configurations desired for possible shapes of the displays. For example, portions of the layered stimulus-responsive material 116 can include layers of vertically, horizontally, diagonally, or other shaped portions. Thus, it is understood that one having skill in the art could determine various configurations for layers of the stimulus-responsive material 116 to enable different arrangements of the display 108.

The stimulus-responsive material 116 can be updated as different images appear on the display 108. For example, the stimulus-responsive material 116 can be activated to cause the display 108 to be arranged in a first shape while a first image (e.g., a first frame of a video) is displayed, and the stimulus-responsive material 116 can be activated in a different way to cause the display 108 to be arranged in a second shape different from the first shape while a second image (e.g., a second frame of the video) is displayed. In some cases, the stimulus-responsive material 116 cannot be configured quickly enough to keep pace with the frame rates of video. As a result, in some embodiments, the stimulus-responsive material 116 is only activated when the display 108 is operated in a picture mode, where, for example, the image on the display updates no more than once per 1, 5, 10, 30, 60, 120, or 180 seconds (e.g., the display 108 is used to display artwork or photography).

Figure 3:
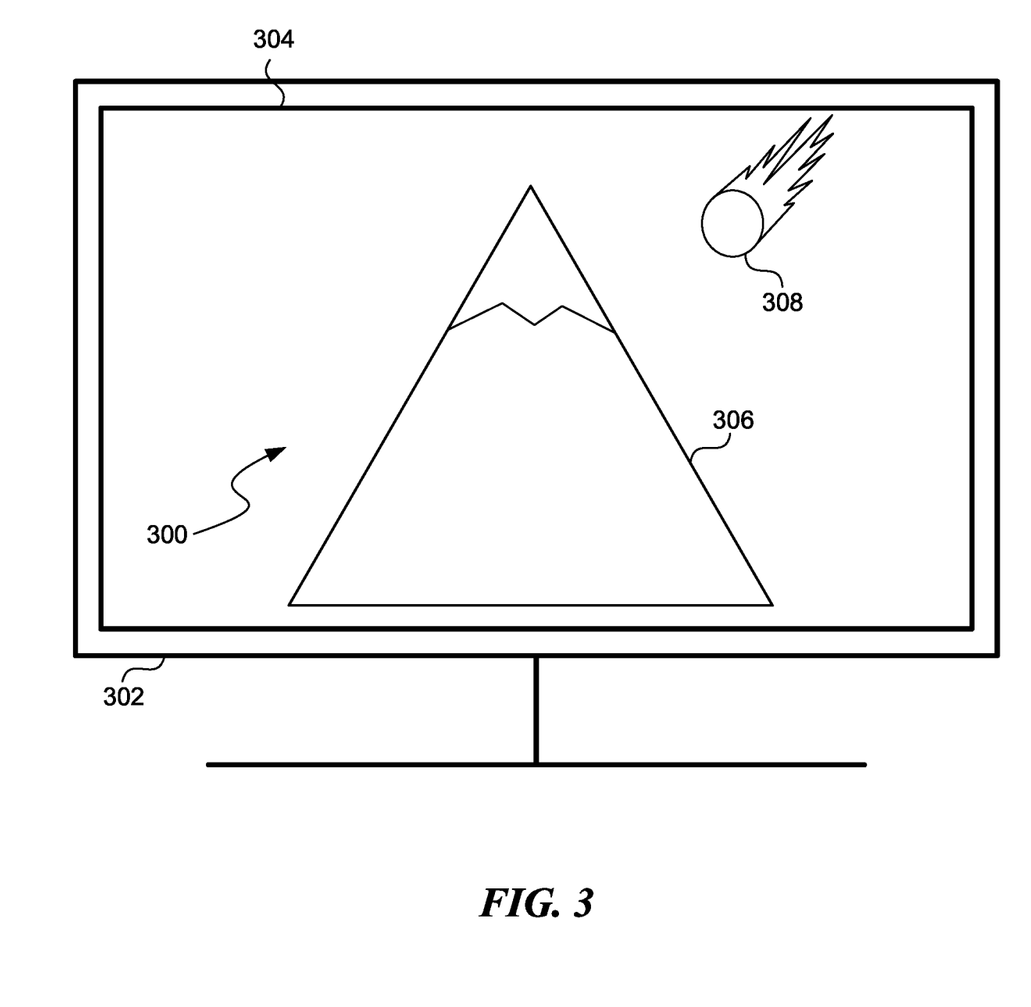
FIG. 3 illustrates an example image that can be displayed on a device display.

FIG. 3 illustrates an example image 300 that can be displayed by an electronic device 302 on a display 304. As illustrated, the electronic device 302 does not include stimulus-responsive material that can be activated to add depth to the display 304. In this way, the display 304 can be a flat display used to display the image without depth. The image 300 includes a mountain 306 and a meteor 308 presented on the display 304. Given that the depth of the display 304 is not varied, depth in the image 300 can only be conveyed through color. Thus, it may be difficult to imitate the 3D nature of the scene captured in the image 300 to a user.

Figure 4:
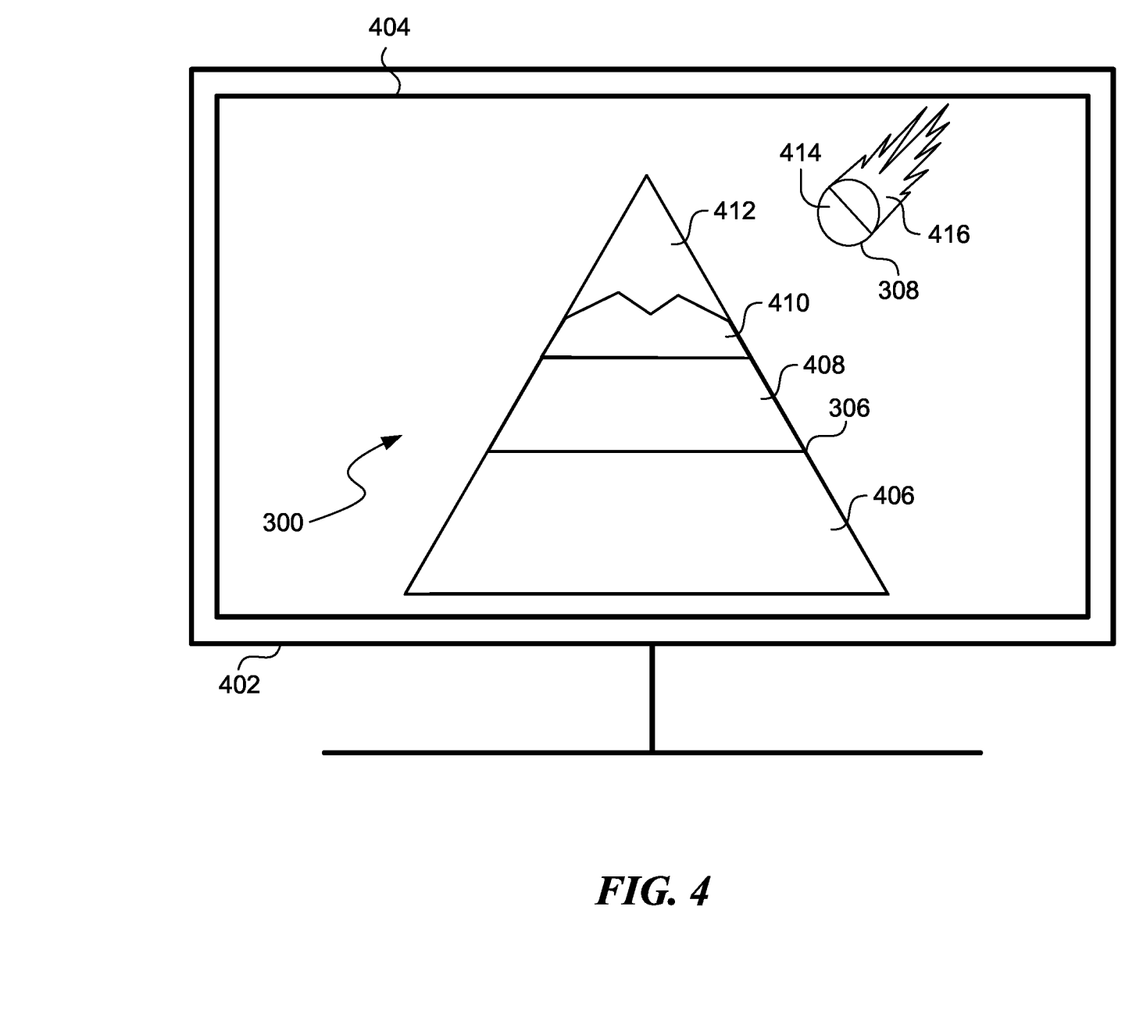
FIG. 4 illustrates an example image that can be displayed on a device display in accordance with aspects of the present technology.

FIG. 4 illustrates the example image 300 as displayed by an electronic device 402 on a display 404 that is configurable using stimulus-responsive material. The image 300 can be presented on the display 404 in a manner similar to that described in relation to FIG. 3, while further adjusting the depth at various portions of the display 404 using stimulus-responsive material. For example, stimulus-responsive material can be expanded to protrude the display 404 at a base portion 406 of the mountain 306, as the base portion 406 of the mountain 306 would appear closer to the user due to the mountain 306 being tapered toward a peak 412. Similarly, stimulus-responsive material at a portion 408 of the mountain 306 above the base portion 406 can be expanded to protrude the display 404 to a lesser extent than at the base portion 406, as the portion 408 would appear farther from the user than the base portion 406. The stimulus-responsive material can be configured such that the display 404 at a portion 410 of the mountain 306 appears less protruded than the display 404 at the portion 408, and the display 404 at the peak 412 of the mountain 306 appears less protruded than the display 404 at the portion 410. In this way, the image 300 can appear to the user as if the mountain 306 is tapered based on the display 404 having varying depths at different locations.

The image 300 further includes the meteor 308, which includes a geological portion 414 and a tail portion 416. As illustrated, the stimulus-responsive material can be expanded at the geological portion 414 to cause the display 404 to protrude at the geological portion 414 by a greater amount than at the tail portion 416. In doing so, the display 404 can present the image 300 with depth such that it appears as though the meteor 308 is traveling toward the user, with the geological portion 414 in the foreground and the tail portion 416 in the background.

In some cases, the depth of the display 404 can be used to mimic the visual appearance of physical artwork. For example, the stimulus-responsive material can be activated to alter the depth of the display 404 to match the topography of a canvas on which a work of art may be painted. As another example, the stimulus-responsive material can be activated to alter the depth of the display 404 to make portions of the display 404 appear slightly protruded where large amounts of paint are deposited on a canvas (e.g., to mimic the topography in portions of oil paintings in which large amounts of paint are deposited). In doing so, digitally displayed works of art can appear more similar to their physical versions. Although a few examples are described, the stimulus-responsive material can be configured in any number of ways to alter the depth of the display 404 to make a displayed image feel more lifelike and improve user experience.

It should be noted that the depth of the display 404 can be configured by expanding or contracting the stimulus-responsive material. In various examples, the display 404 can be protruded from a resting position or recessed from a resting position, and the depth of the display 404 can result from a mix of expansions and protrusions, as illustrated in FIG. 5.

Figure 5:
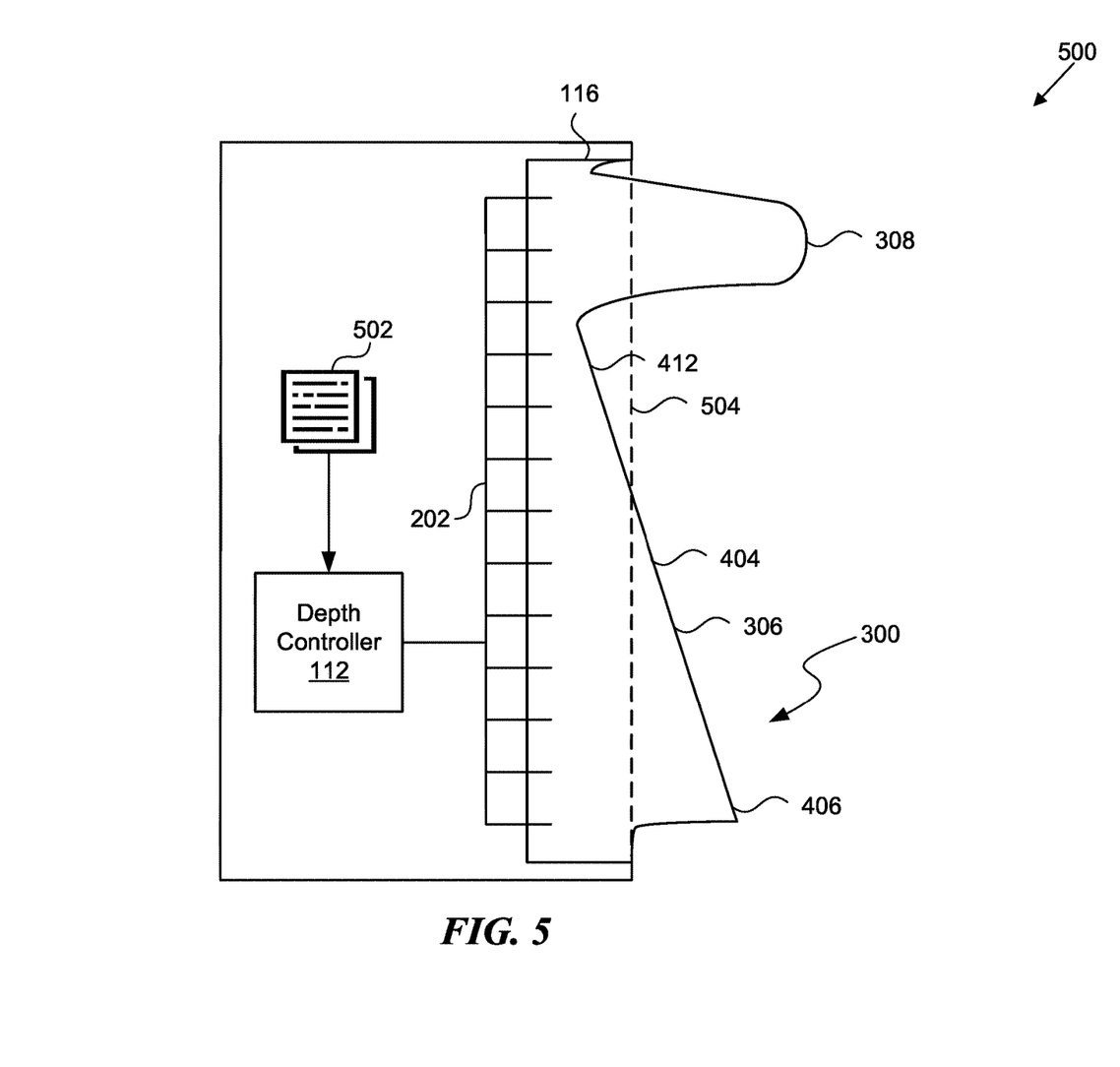
FIG. 5 illustrates a simplified schematic cross-sectional view of a device display that can implement aspects of the present technology.

FIG. 5 illustrates a simplified schematic side view 500 of the electronic device 402 displaying the image 300 on the display 404 while altering the shape of the display 404 using stimulus-responsive material 116. For example, depth data 502 is determined, and the depth controller 112 utilizes the depth data 502 to activate the portions of the stimulus-responsive material 116 through the circuitry 202. In aspects, the depth data 502 can be determined by analyzing (e.g., using the image data indicative of the image 300) a portion of the image 300 and its surroundings to determine a perceived depth of the image 300 at that location. For example, the depth can be determined using a 2D-to-3D processing tool. Alternatively or additionally, the depth data 502 can be collected using a depth sensor (e.g., a radar or lidar sensor) that captures the depth of an environment captured to produce the image 300. In general, the depth controller 112 can expose the stimulus-responsive material 116 to a stimulant based on the depth data 502.

In response to the stimulant, the stimulus-responsive material 116 can be activated, causing it to displace into a new shape. For example, when the stimulus-responsive material 116 is in a deactivated configuration 504 (e.g., when the display 404 is not exposed to the stimulant), the display 404 can be flat. When the stimulus-responsive material 116 is exposed to the stimulant, it can reconfigure into a new shape, displacing the display 404 in the process. As illustrated, the stimulus-responsive material 116 causes the display 404 to protrude at a portion of the display that presents the base portion 406 of the mountain 306 and recede at a portion of the display that presents the peak portion 412 of the mountain. Moreover, the display 404 is tapered from the base portion 406 to the peak portion 412 to mimic the tapering of the mountain 306. The display 404 is similarly protruded at the meteor 308.

The amount to which the display 404 can protrude or recess can be dependent on the properties of the stimulus-responsive material 116 or the flexibility of the display 404. In aspects, the display 404 can extend or protrude from the deactivated configuration 504 by no more than 0.25, 0.5, 1, 2, 3, 4, or 5 inches. Moreover, the stimulus-responsive material 116, and thus the display 404, can return to a deactivated configuration 504 (e.g., a rest position) when the stimulus-responsive material 116 has not been exposed to the stimulant for a period of time. In this way, the stimulus-responsive material 116 can be reconfigured multiple times to adjust the depth of the display 404 to match a displayed image without permanently altering the display 404.

Figure 6:
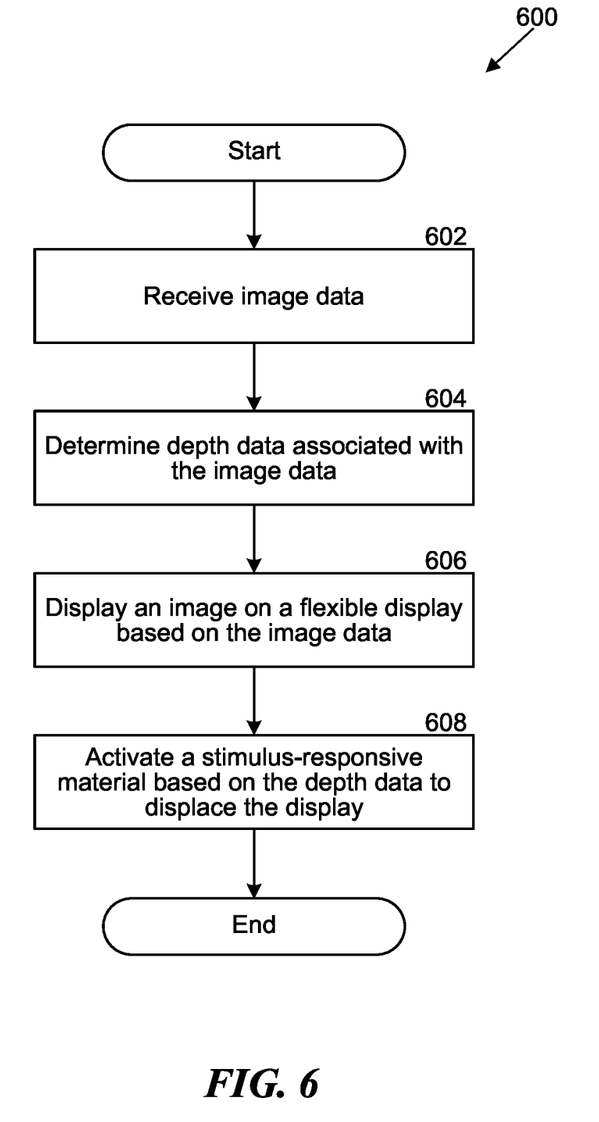
FIG. 6 illustrates an example method for implementing aspects of the present technology.

FIG. 6 illustrates an example method 600 for implementing aspects of the present technology. In aspects, the method 600 can be performed by an electronic device or portions of an electronic device (e.g., a processor, a display controller, a depth controller). In some cases, portions of the method 600 can be performed by one or more distributed components. Moreover, portions of the method 600 can be implemented using any combination of hardware, software, or firmware. The method 600 can include one or more operations not illustrated in FIG. 6. Similarly, operations of the method 600 can be reorganized, combined, or omitted.

At 602, image data is received. The image data can indicate luminance of one or more colors (e.g., red, green, blue) for various locations (e.g., pixels) in an image. In some cases, the image data can indicate a frame of a video. In other cases, the image data can indicate a photograph or an NFT.

At 604, depth data associated with the image data is determined. For example, the depth data can be received from a depth sensor (e.g., a radar or lidar sensor) that captures the depth of a scene captured in the image. In other cases, the image data can be analyzed to determine the depth data. For example, portions of the image data can be analyzed to determine a perceived depth at one or more locations in the image, and the perceived depth can be used to determine the depth data. The depth data can be determined through 2D-to-3D image processing. In aspects, the depth data can indicate to what extent a particular portion of the image is in the background or the foreground. In some cases, the image data can be artwork. In this case, the depth data can mimic the topography of a canvas or portions of a painting in which paint is accumulated.

At 606, the image is displayed on the flexible display based on the image data. For example, pixels of the display can be illuminated in accordance with the image data to display the image. The display can include any display capable of presenting an image. As a result, the image can be displayed in any number of ways appropriate for displaying an image on a particular type of display.

At 608, stimulus-responsive material is activated based on the depth data to displace the display disposed at least partially over the stimulus-responsive material. For example, portions of the stimulus-responsive material that correspond to locations on the display that present portions of the image in the foreground can be expanded to protrude these locations on the display, while stimulus-responsive material that corresponds to locations on the display that present portions of the image in the background can be expanded to a lesser extent or contracted to protrude these locations on the display by a lesser extent or recess these locations on the display, respectively. The stimulus-responsive material is activated at least partially concurrent with display of the image on the display to add depth to the display while presenting the image. In this way, the image can be displayed to the user with a depth such that the image appears to be 3D, which can improve user experience and further immerse the user in the image.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; and the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. An electronic device, comprising:
a flexible display having a front surface;
a stimulus-responsive material disposed at least partially under the flexible display,
wherein the stimulus-responsive material comprises multiple layers arranged at different points along an axis substantially perpendicular to the front surface and having different arrangements, each of the multiple layers having one or more activatable portions binarily configurable between a respective deactivated shape when not activated by the stimulant and a respective activated shape when activated by the stimulant;

at least one processor; and at least one non-transitory computer-readable storage medium storing instructions, which, when executed by the at least one processor, cause the at least one processor to:

receive image data;

determine or receive depth data relating to the image data;

display, on the flexible display, an image based on the image data; and activate, using a stimulant, the stimulus-responsive material based on the depth data to cause the stimulus-responsive material to change from a first shape to a second shape, wherein activating the stimulus-responsive material is at least partially concurrent with displaying the image and comprises activating at least two of the multiple layers, and wherein the stimulus-responsive material displaces at least a portion of the flexible display in a direction substantially perpendicular to the front surface when changing from the first shape to the second shape.

2. The electronic device of claim 1, wherein the at least one processor is further caused to:

determine perceived depths of different portions of the image based on the image data; and determine the depth data based on the perceived depths.

3. The electronic device of claim 1, wherein:

at least one layer of the multiple layers of the stimulus-responsive material comprises multiple discrete portions; and the at least one processor is further caused to:

activate, using the stimulant, a first discrete portion of at the least one layer of the multiple layers of the stimulus-responsive material based on the depth data to cause the first discrete portion to displace by a first amount; and activate, using the stimulant, a second discrete portion at the least one layer of the multiple layers of the stimulus-responsive material based on the depth data to cause the second discrete portion to displace by a second amount different from the first amount.

4. The electronic device of claim 1, wherein the stimulus-responsive material is configured to expand or contract along an axis normal to the flexible display.

5. The electronic device of claim 1, wherein the at least one processor is further caused to display a new image no more than once every ten seconds.

6. The electronic device of claim 1, further comprising circuitry coupled with the stimulus-responsive material, wherein the at least one processor is further caused to:

transmit, via the circuitry, current to at least one of the one or more activatable portions of at least one layer of the multiple layers of the stimulus-responsive material based on the depth data to activate the at least one of the one or more activatable portions.

7. The electronic device of claim 1, wherein the at least one processor is further configured to heat at least one of the one or more activatable portions of at least one layer of the multiple layers of the stimulus-responsive material based on the depth data to activate the at least one of the one or more activatable portions.

8. The electronic device of claim 1, wherein the at least one processor is further configured to generate a magnetic field in at least one of the one or more activatable portions of at least one layer of the multiple layers of the stimulus-responsive material based on the depth data to activate the at least one of the one or more activatable portions.

9. The electronic device of claim 1, wherein the stimulus-responsive material comprises magnetic, electroactive, or thermally activated nanoparticles or a magnetic, electroactive, or thermally activated polymer.

10. The electronic device of claim 1, wherein the at least one processor is further caused to receive depth data relating to the image, the depth data including one or more depth measurements of an environment that was captured to produce the image data, the depth measurements captured using a sensor capable of measuring depth in the environment.

11. The electronic device of claim 1, wherein:

at least one layer of the multiple layers of the stimulus-responsive material comprises multiple discrete portions, each of the multiple discrete portions having a respective deactivated shape when not activated by the stimulant and a respective activated shape when activated by the stimulant; and the at least one processor is further caused to activate multiple of the multiple discrete portions to change the stimulus-responsive material from the first shape to the second shape.

12. A computer-implemented method comprising:

receiving image data;

determining depth data associated with the image data;

displaying, on a flexible display of an electronic device, an image based on the image data; and activating a material of the electronic device that is disposed at least partially under the flexible display based on the depth data to cause a first portion of the material to displace by a first amount and cause a second portion of the material to displace by a second amount, wherein the material is activated by a stimulant, wherein the material comprises multiple layers arranged at different points along an axis substantially perpendicular to the flexible display and having different arrangements, each of the multiple layers having one or more activatable portions binarily configurable between a respective deactivated shape when not activated by the stimulant and a respective activated shape when activated by the stimulant, wherein the one or more activatable portions of a first layer of the multiple layers comprises the first portion of the material, wherein the one or more activatable portions of a second layer of the multiple layers comprises the second portion of the material, wherein activating the material is at least partially concurrent with displaying the image, and wherein the material displaces the flexible display from a rest configuration and into a first configuration when activated based on the depth data.

13. The method of claim 12, further comprising:

determining perceived depths of different portions of the image based on the image data; and determining the depth data based on the perceived depths.

14. The method of claim 12, further comprising transmitting, via circuitry coupled with the stimulus-responsive material, current to the stimulus-responsive material based on the depth data to activate the stimulus-responsive material.

15. The method of claim 12, further comprising:
receiving additional image data;
determining additional depth data relating to the additional image data;
displaying, on the flexible display, an additional image based on the additional image data; and
at least partially concurrent with displaying the additional image, activating the stimulus-responsive material based on the additional depth data to cause the stimulus-responsive material to displace,
wherein the stimulus-responsive material displaces the flexible display into a second configuration when activated based on the additional depth data, and
wherein the second configuration is different from the first configuration.

* * * * *